T. RUHLMANN.
ROTARY MOTOR.
APPLICATION FILED APR. 19, 1912.
1,078,168.
Patented Nov. 11, 1913.
4 SHEETS—SHEET 1.
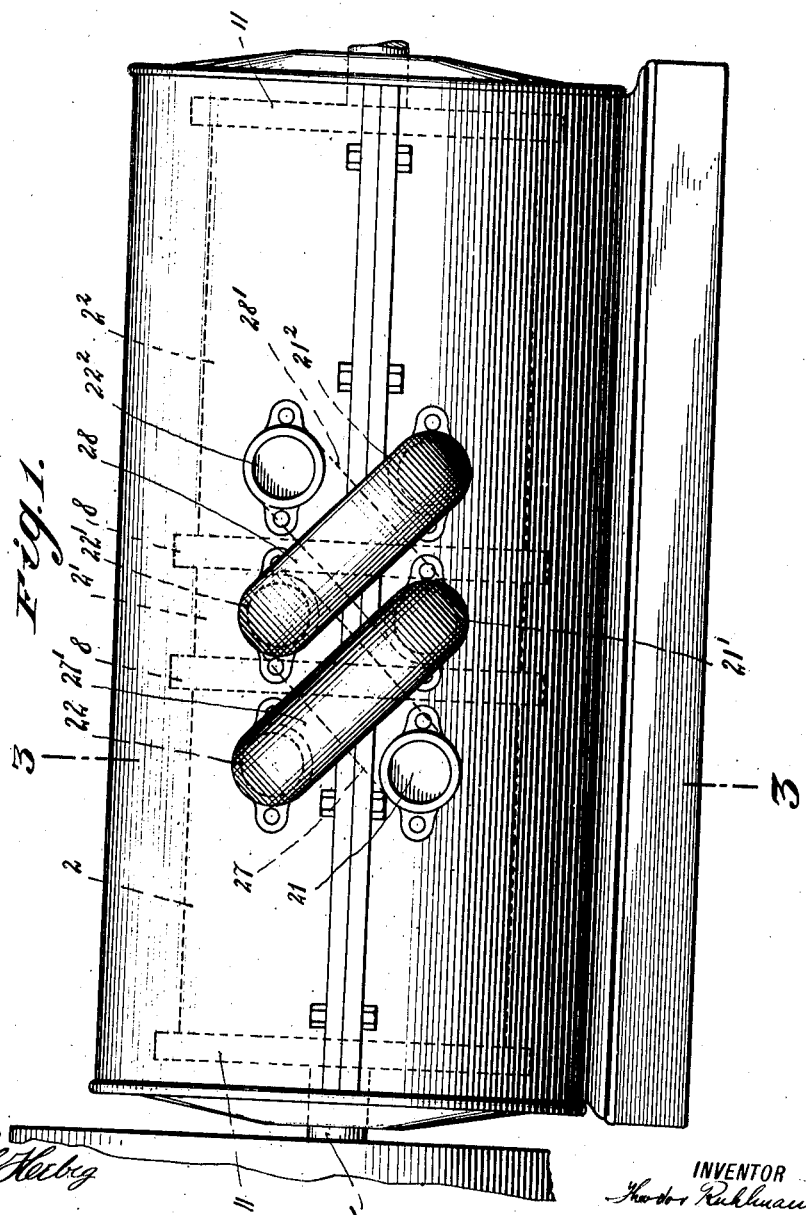

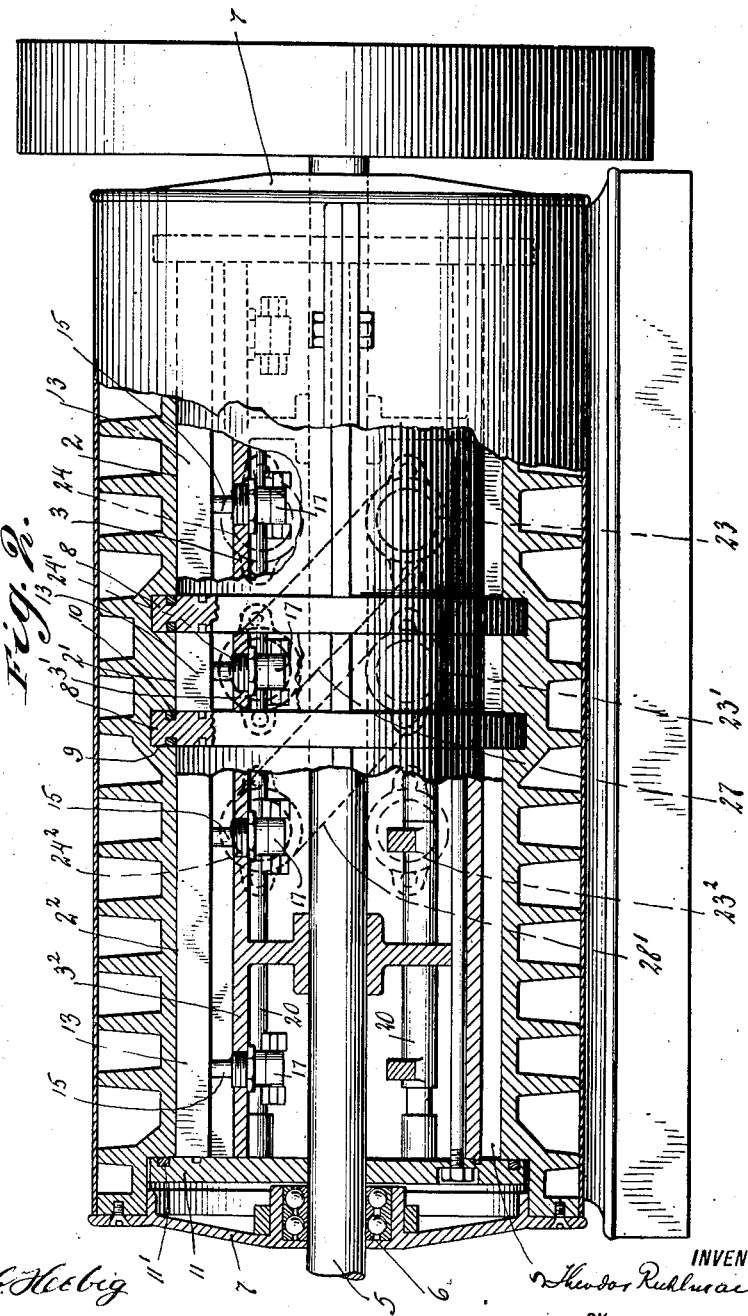

T. RUHLMANN.
ROTARY MOTOR.
APPLICATION FILED APR. 19, 1912.
1,078,168.
Patented Nov. 11, 1913.
4 SHEETS—SHEET 3.
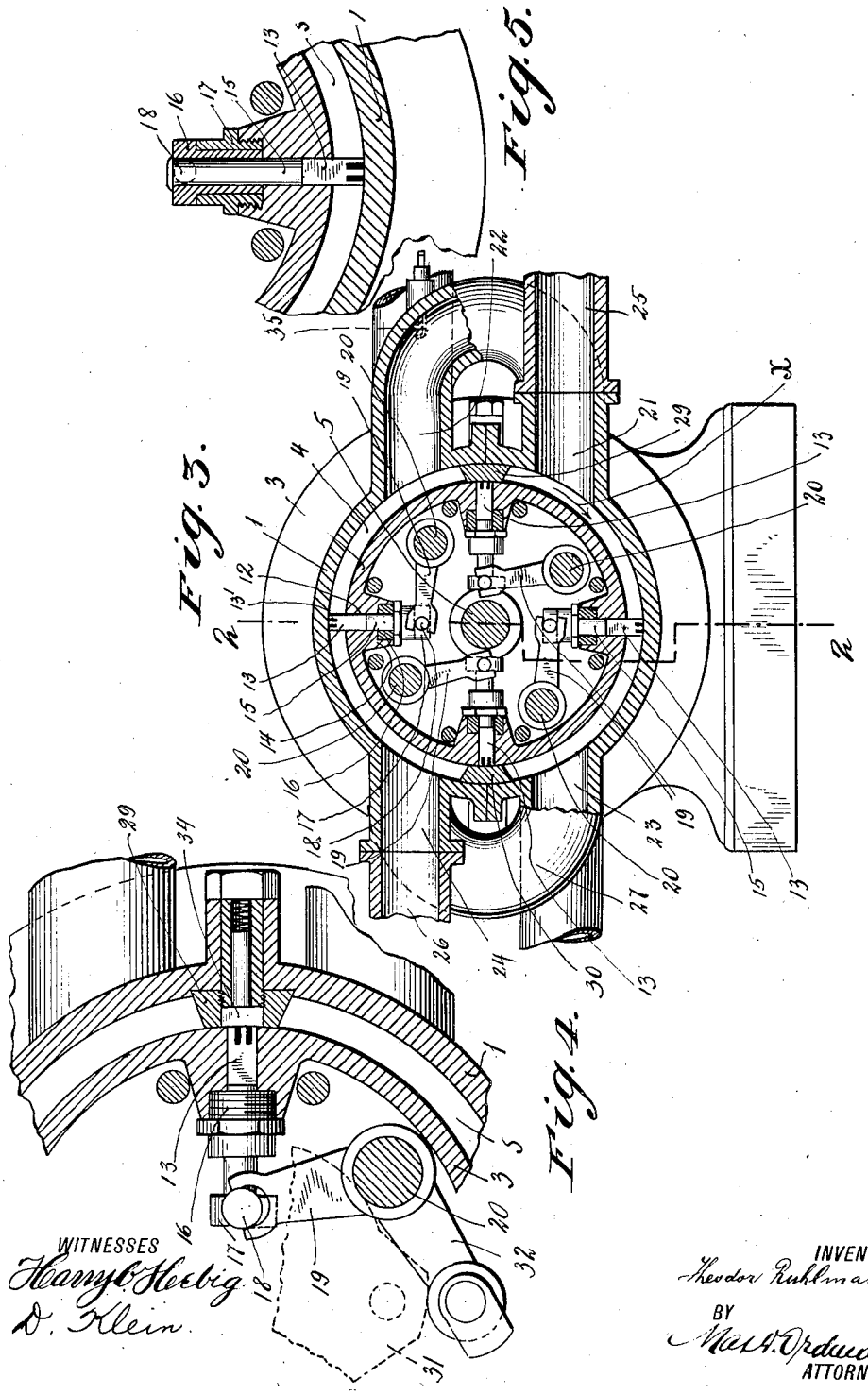

T. RUHLMANN.
ROTARY MOTOR.
APPLICATION FILED APR. 19, 1912.
1,078,168.
Patented Nov. 11, 1913.
4 SHEETS—SHEET 4.
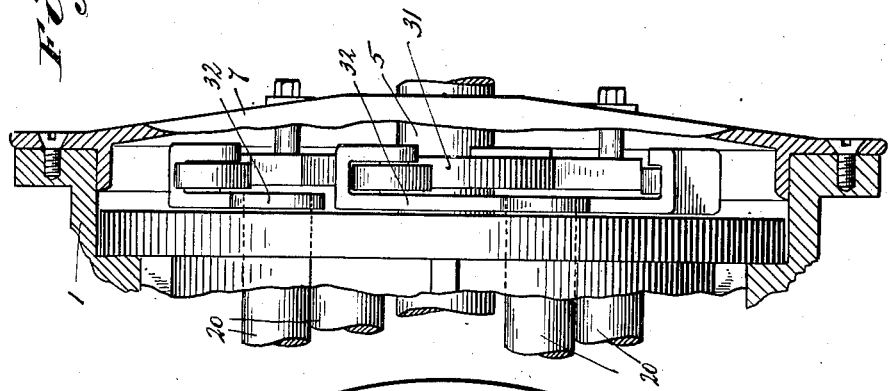
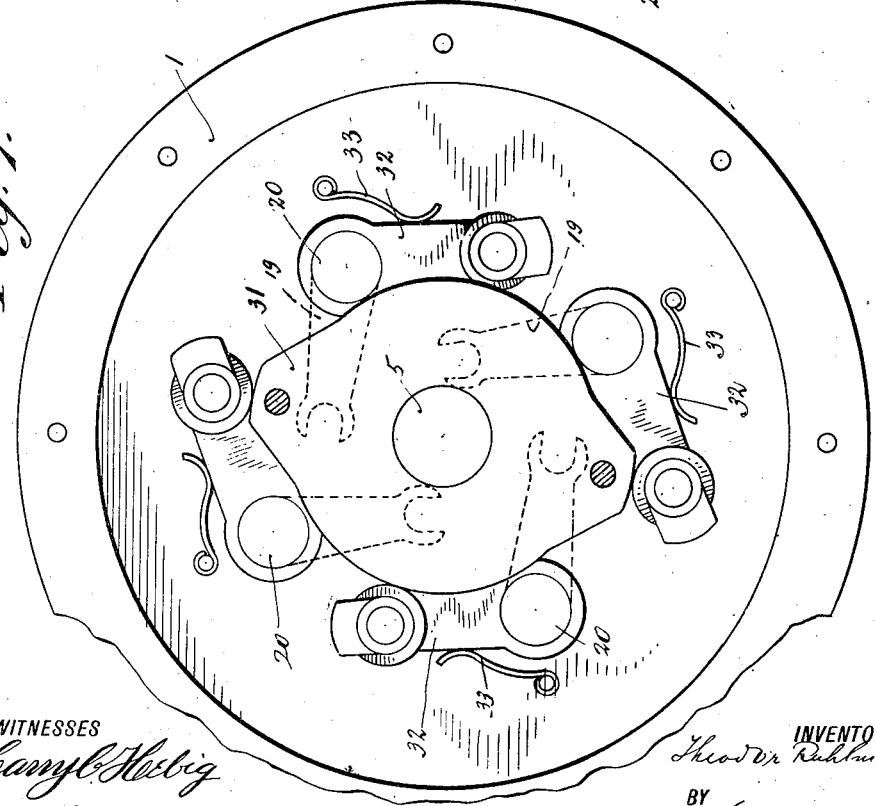

UNITED STATES PATENT OFFICE.

THEODOR RUHLMANN, OF NEW YORK, N. Y.

ROTARY MOTOR.

1,078,168.

Specification of Letters Patent.

Patented Nov. 11, 1913.

Application filed April 19, 1912. Serial No. 691,979.

*To all whom it may concern:*

Be it known that I, THEODOR RUHLMANN, a subject of the German Emperor, residing at New York, in the county of New York and State of New York, have invented certain new and useful Improvements in Rotary Motors, of which the following is a specification.

The present invention relates to rotary motors and has for its object to provide a construction whereby the efficiency of the motor will be greatly increased.

The motor, according to this invention, may with slight modifications be used as an explosion motor, steam or hot air engine.

The principle on which my construction is based is that the motor is divided in two or more compartments, each containing revolving pistons and of which one compartment serves for the compression of the driving medium, a second one as the explosion compartment, if the motor is used as an explosion motor, or as an expansion compartment if the motor is used as steam or hot air engine. In the case of explosion motors, I provide three compartments, the third compartment serving as the power compartment.

To make my invention more clear, the same is illustrated in the accompanying drawings which form part of this specification and in which similar reference characters denote corresponding parts, Figure 1 being a side elevation of the motor; Fig. 2 a partial longitudinal section thereof through line 2—2 of Fig. 3; Fig. 3 a cross section; Figs. 4 and 5 enlarged partial cross sections similar to Fig. 3 illustrating some details of construction; and Figs. 6 and 7 are respectively a longitudinal section and an end view of the cylinder showing other details of construction.

In the drawings I have illustrated as an example an explosion motor, and it will be seen that the same construction, with slight modifications, may be used for steam or hot air engines.

In the drawings 1 denotes a sectional tubular casing or cylinder which is divided into three compartments 2, 2', 2², of different lengths. In each compartment a rotary piston 3, 3', 3² respectively is provided which pistons are all of uniform but smaller diameter than the inner diameter of the cylinder, so that a comparatively narrow annular space 4 for the driving medium is formed between the outer circumference of the pistons and the inner circumference of the cylinder. All three pistons are fixed to a power shaft 5 which extends longitudinally through the cylinder and is supported in ball bearings 6 provided in the end covers 7 of the cylinder. For the partition of the cylinder into different compartments, circular disks 8 are provided which, too, are fixed to the power shaft and which rotatively engage circular grooves 9 provided in the inner circumference of the cylinder. These disks are adapted to tightly close the different compartments from one another and to this end their lateral surfaces are provided with packing rings 10. The outer end openings of the compartments 2 and 2² are tightly closed in a similar manner by disks 11 having packing rings 11'. Each of the pistons 3, 3', and 3² consists of a hollow cylindrical body which on its outer circumference is provided with diametrically opposed longitudinal recesses or slots 12. Slidably borne in these slots are power transmitting members 13 consisting of longitudinally extending bars and which in their outer edges carry suitable packing strips 13'. In the interior the hollow pistons are reinforced by longitudinal ribs 14 arranged opposite the recessed portions and in these ribs the recesses are extended so that the power transmitting members of the pistons which normally are adapted to project toward and bear against the inner circumference of the cylinder, may at certain periods, be allowed of being retracted so that their outer edges are even with the circumference of the piston. The inner edges of the said power transmitting members are secured to pins or short rods 15 which are slidably fitted in tight bushings 16 and at their free ends are formed with head pieces 17 carrying lateral pins 18. These pins are engaged by bifurcated levers 19 fixed to longitudinal spindles 20 which extend throughout the entire length of the cylinder through the different compartments and through the partition disks 7 and are borne in bearings formed in the end disks 11.

The compartments are each provided with openings which are arranged in a similar manner as those shown for the compartment 1 in Fig. 3, so that a description of the openings with reference to Fig. 3 will suffice for the understanding of the arrangements of of the openings of all compartments. The openings of the different compartments are denoted by the same reference characters distinguished only by different apostrophic characters corresponding to those of the reference characters of the compartments. In the compartment 1 (Fig. 3) the diametrically opposed openings 21 and 24 serve as admission openings and have fuel supply pipes 25, 26 joined thereto. The opening 23 of the compartment 1 is connected by a pipe 27 to the opening 24' of the compartment 2' and the opposite opening 22' of the said compartment 2' is connected by a pipe 28 to the opening $21^2$ of the compartment $2^2$. The opposite opening $23^2$ of compartment $2^2$ serves as discharge. The opening 22 of the compartment 2 is connected by a pipe 27' to the opening 21' of the compartment 2' and the opposite opening 23' of the said compartment 2' is connected by a pipe 28' to the opening $24^2$ of the compartment $2^2$. The opposite opening $22^2$ of the compartment $2^2$ serves also as discharge. Thus the three compartments are able to communicate with one another through two sets of pipes.

In each compartment midway between two superposed openings on both sides of the cylinder are arranged inwardly projecting partitions 29, 30 which are of prismatic cross section and which are adapted with their inner edges to tightly bear against the circumference of the respective pistons 3, 3', $3^2$.

The power transmitting members 13 are adapted immediately on approaching the partitions 29 and 30 to be retracted which is accomplished by means of a cam 31 arranged centrally at one end of the cylinder and fixed thereto. The outer ends of the spindles 20 have fixed thereto roller carrying levers 32 which are actuated by springs 33 and are adapted to constantly bear with their rollers on the circumference of the cam. When the pistons revolve the levers 32 will be operated by the stationary cam 31 and in consequence thereof the bifurcated levers 19 will retract the members 13 at the predetermined periods. On being released from the cam portions of the disk 31 the levers will be thrust into normal position by force of the springs 33. The members 13 of all three compartments will work synchronously. To insure a lasting tight closure of the partitions 29 and 30 against the rotary pistons, the partition may be made hollow and be provided with spring actuated packing members 34.

The mode of operation of the motor is as follows: There are the same number of wings or members 13 in each compartment and all the members are arranged at corresponding points. The combustion medium is admitted simultaneously through the pipes 25 and 26 and openings 21, 24 into the two halves of the compartment 2. We will assume the pistons to revolve in the direction of the arrow X (Fig. 3). In the present example there are four members 13 for each piston. Each time a member 13 passes the openings 21 and 24 it will create a suction action drawing behind it the fuel into the annular space $s$, until it reaches the opposite opening 23 or 22. At this time the next following member has so far advanced that it will close the opening 21 or 24 and while it draws behind it fresh fuel it will compress the fuel in front of it forcing it into the smallest intermediate compartment 2' through pipe 27. The compartment 2' in the present example is made about four times smaller than compartment 2 and therefore the fuel will be highly compressed therein. The fuel enters the compartment 2' through opening 24' and by the wing or member 13 in said compartment which corresponds to that shown at the left in Fig. 3, it is forced to flow through the upper half of space $s$ and pass through the opposite opening 22' and pipe 28 into the third compartment $2^2$. Prior to entering the third compartment ignition takes place by a suitable igniter 35 arranged in the pipes 28 and the exploded fuel acts in compartment 2' against the above named member and in the largest compartment $2^2$ against the lower member or wing which corresponds to that shown in Fig. 3. In the smallest compartment it will have a counteracting effect on the wing or member, i. e. it will tend to drive the piston in reverse direction. To recuperate the loss of power occasioned thereby the compartment $2^2$ is made about five times as large as compartment 2'. The comparatively higher pressure in the last named compartment will give the pistons 3, 3' and $3^2$ an impulse in the direction of the arrow (Fig. 3). In a similar manner the fuel admitted through opening 24 of compartment 2 will operate the pistons. The two operations will counterbalance the action on the power shaft. The exploded fuel admitted through opening 21 will be discharged through opening $23^2$ of compartment $2^2$ and that admitted through opening 24 of compartment 2 will be discharged through opening $22^2$ of compartment $2^2$.

Before the entire quantity of exploded fuel is discharged the right hand wing or member 13 in compartment $2^2$ corresponding to that in Fig. 3 closes the opening $21^2$ of compartment $2^2$ and a quantity of burned fuel will remain in the compartment 2'. It is clear that owing to the residual burned fuel the loss of tension of the incoming fresh fuel owing to decreased expansion space will be greatly minimized.

If the motor is used for steam only two compartments are necessary, to wit one for high pressure and a second for expansion.

For hot air the compression compartment will be made ten times as large as the expansion compartment.

What I claim and desire to secure by Letters Patent is:

1. In a rotary motor, a cylinder divided longitudinally into a plurality of compartments of different length, in each compartment a rotary piston, forming an annular chamber between itself and the said cylinder, all pistons being rigidly connected, partitions in each compartment dividing the annular chamber thereof into two tightly separated halves, a plurality of retractable members for each piston projecting through said annular space and bearing tightly against the inner circumference of the cylinder; one end compartment having an admission opening for each half of its annular chamber, the other end compartment having a discharge opening for each half of its annular chamber and the lower and the upper halves of the different compartments being alternately connected to communicate with one another and cam operated means in each of said rotary pistons operatively connected to said members.

2. In a rotary motor, a cylinder divided longitudinally into a plurality of compartments of different lengths, in each compartment a rotary piston, forming an annular chamber between itself and the said cylinder, all pistons being rigidly connected, partitions in each compartment dividing the annular chamber thereof into two tightly separated halves, a plurality of retractable members for each piston projecting through said annular chamber and bearing tightly against the inner circumference of the cylinder, said members in all compartments being arranged at corresponding points, and cam controlled means for periodically operating said members and arranged in each of said rotary pistons, one end compartment having an admission opening for each half of its annular chamber, the other end compartment having a discharge opening for each half of its annular chamber and the lower and the upper halves of the different compartments being alternately connected to communicate with one another.

3. In a rotary explosion motor, a cylinder divided longitudinally into three compartments, of which the intermediate one is the smallest and one of the end compartments the largest, in each compartment a rotary piston forming an annular chamber between itself and the cylinder, all pistons being rigidly connected, partitions in each compartment dividing the annular chamber thereof into two tightly separated halves, a plurality of retractable members for each piston projecting through said annular chamber and bearing tightly against the inner circumference of the cylinder, said members in all three compartments being arranged at corresponding points, and cam controlled means for periodically operating said members and arranged in each of said rotary pistons, the next largest end compartment having an admission opening for each half of its annular chamber, the largest end compartment having a discharge opening for each half of its annular chamber and all compartments being connected to communicate with one another.

In testimony whereof I affix my signature in presence of two witnesses.

THEODOR RUHLMANN.

Witnesses:
 JOHN T. CARMODY,
 MAX D. ORDMANN.